US012587507B2

(12) United States Patent
Pazhyannur et al.

(10) Patent No.: US 12,587,507 B2
(45) Date of Patent: Mar. 24, 2026

(54) CONTROLLER-ENABLED DISCOVERY OF SD-WAN EDGE DEVICES

(71) Applicant: Ruckus IP Holdings LLC, Claremont, NC (US)

(72) Inventors: Rajesh Pazhyannur, Fremont, CA (US); Anindya Chakraborty, Fremont, CA (US)

(73) Assignee: Ruckus IP Holdings LLC, Horsham, PA (US)

( * ) Notice: Subject to any disclaimer, the term of this patent is extended or adjusted under 35 U.S.C. 154(b) by 93 days.

(21) Appl. No.: 18/353,928

(22) Filed: Jul. 18, 2023

(65) Prior Publication Data

US 2024/0031338 A1 Jan. 25, 2024

Related U.S. Application Data

(60) Provisional application No. 63/390,304, filed on Jul. 19, 2022.

(51) Int. Cl.
 *H04L 9/40* (2022.01)
 *H04L 12/46* (2006.01)
 *H04L 67/141* (2022.01)
(52) U.S. Cl.
 CPC ........ *H04L 63/029* (2013.01); *H04L 12/4633* (2013.01); *H04L 12/4641* (2013.01); *H04L 67/141* (2013.01)
(58) Field of Classification Search
 CPC ............... H04L 63/029; H04L 12/4633; H04L 12/4641; H04L 67/141
 See application file for complete search history.

(56) References Cited

U.S. PATENT DOCUMENTS

| | | | | |
|---|---|---|---|---|
| 8,407,350 B2 * | 3/2013 | Stephenson | ........... | H04L 63/029 |
| | | | | 709/227 |
| 2002/0143944 A1 * | 10/2002 | Traversat | .............. | H04L 63/105 |
| | | | | 709/225 |
| 2002/0169980 A1 * | 11/2002 | Brownell | ............ | H04L 63/0272 |
| | | | | 726/4 |
| 2005/0086300 A1 * | 4/2005 | Yeager | .................. | H04L 69/329 |
| | | | | 709/204 |
| 2006/0215684 A1 * | 9/2006 | Capone | ................. | H04L 63/029 |
| | | | | 709/227 |
| 2007/0061460 A1 * | 3/2007 | Khan | .................. | H04L 63/0428 |
| | | | | 709/225 |

(Continued)

*Primary Examiner* — Michael Won
(74) *Attorney, Agent, or Firm* — Myers Bigel, P.A.

(57) ABSTRACT

During operation, a computer system may establish a connection with an electronic device. Then, the computer system may receive, from a port in a firewall, a packet associated with the electronic device, where the packet includes an IP address of the electronic device. Moreover, the computer system may provide, to the port, a response addressed to the IP address. Next, the computer system may receive an acknowledgment associated with the electronic device that indicates that the response was received. Furthermore, the computer system may provide, addressed to the electronic device, a second IP address of a second electronic device and a second port in a second firewall associated with the second electronic device. Additionally, the computer system may provide, addressed to the second electronic device, the IP address of the electronic device and the port in the firewall.

14 Claims, 6 Drawing Sheets

(56)                References Cited

U.S. PATENT DOCUMENTS

| | | | |
|---|---|---|---|
| 2007/0214273 A1* | 9/2007 | Kacker ................. | H04L 63/029 |
| | | | 709/229 |
| 2012/0281708 A1* | 11/2012 | Chauhan .............. | H04L 67/141 |
| | | | 370/401 |
| 2013/0298182 A1* | 11/2013 | May ........................ | H04L 63/10 |
| | | | 726/1 |
| 2014/0006552 A1* | 1/2014 | Frei ........................ | H04L 67/55 |
| | | | 709/217 |
| 2020/0213151 A1* | 7/2020 | Srivatsan ............ | H04L 63/0471 |
| 2020/0220746 A1* | 7/2020 | Shribman ............. | H04W 48/18 |
| 2020/0412708 A1* | 12/2020 | Oberoi ................. | H04L 63/029 |
| 2022/0103525 A1* | 3/2022 | Shribman ........... | G06F 16/9566 |
| 2022/0353244 A1* | 11/2022 | Kahn ..................... | H04L 67/12 |
| 2022/0353295 A1* | 11/2022 | Yeh ....................... | H04L 63/029 |
| 2023/0388383 A1* | 11/2023 | Venkatesh .............. | H04L 12/66 |

* cited by examiner

CONTROLLER-ENABLED DISCOVERY OF SD-WAN EDGE DEVICES

CROSS REFERENCE TO RELATED APPLICATIONS

This application claims priority under 35 U.S.C. 119(e) to U.S. Provisional Application Ser. No. 63/390,304, "Controller-Enabled Discovery of SD-WAN Edge Devices," filed on Jul. 19, 2022, by Rajesh Pazhyannur, et al., the contents of which are herein incorporated by reference.

FIELD

The described embodiments relate to techniques for establishing secure communication between electronic devices in a software-defined wide area network (SD-WAN. Notably, the described embodiments relate to techniques for establishing secure communication between electronic devices in an SD-WAN based at least in part on controller-enabled discovery.

BACKGROUND

Many electronic devices are capable of wirelessly communicating with other electronic devices. In particular, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that communicate wirelessly with each other and with other electronic devices using Wi-Fi, and that provide access to another network (such as the Internet) via IEEE 802.3 (which is sometimes referred to as 'Ethernet').

In some systems, the communication capabilities of electronic devices are used in a wide area network (WAN). A WAN is typically a large network that facilitates the sharing of information between electronic devices via a WAN provider and is not tied to a single location. In a traditional WAN, packets are communicated using a multiprotocol label switching (MPLS) connections (in which packets are routed using labels corresponding to established paths instead of network addresses of endpoints), thereby ensuring that packets are private and reducing or eliminating packet loss.

Moreover, an SD-WAN provides secure communication using end-to-end encryption over a virtual private network (VPN) connection. For example, an SD-WAN may be used to securely connect different branches of a company or an organization, such as different offices. In an SD-WAN, typically a controller (which is distinct from the network) may be used to define policies, such as which branches can communicate and the routes or paths.

In order to establish an SD-WAN, edge devices (which are sometimes referred to as 'endpoints' or 'electronic devices') usually need to discover each other so that secure communication (e.g., tunnels) can be set up. Notably, in order to set up tunnels in an SD-WAN, the Internet Protocol (IP)

addresses of edge devices need to be public. For example, if edge device A has a public IP address of 24.6.22.216 and edge device B has a public IP address of 24.6.22.217, then these edge devices can set up a bidirectional tunnel between them for secure communication. Alternatively, when at least one of edge devices A and B has a public IP address, then traffic can be routed through that edge device (which essentially makes it into a hub).

However, when both of edge devices A and B have private IP addresses, they typically cannot directly reach each other and, thus, may be unable to set up secure communication. For example, edge devices A and B may be located behind network address translation (NAT) firewalls and/or another type of firewall. In some cases, they may have different public and private IP addresses. In principle, this may allow electronic devices A and B to solicit each other's private IP addresses using the public IP addresses. But when there are no public IP addresses, it may not be possible for electronic devices A and B to discovery each other, so they may not be able to set up a tunnel.

In some SD-WANs, this problem is addressed by temporarily disabling the NAT firewall and/or defining a bypass rule, such a pinhole in a NAT firewall. For example, when an edge device provides a query to a particular port, a NAT firewall may provide a private IP address, which can then be used to set up a tunnel. However, temporarily disabling the NAT firewall may increase security risks, and defining a bypass rule is often cumbersome and a network administrator may not have the necessary privileges to obtain the bypass information for an SD-WAN.

SUMMARY

A computer system that facilitates discovery of electronic devices in a network is described. This computer system includes: an interface circuit, a processor, and a memory storing program instructions. During operation, the computer system establishes a connection with an electronic device in the network, where the electronic device is associated with a firewall. Then, the computer system receives a packet associated with the electronic device, where the packet includes an IP address of the electronic device and is associated with a port in the firewall. Moreover, the computer system provides, to the port, a response addressed to the IP address. Next, the computer system receives an acknowledgment associated with the electronic device that indicates that the response was received. Furthermore, the computer system provides, addressed to the electronic device, a second IP address of a second electronic device and a second port in a second firewall associated with the second electronic device. Additionally, the computer system provides, addressed to the second electronic device, the IP address of the electronic device and the port in the firewall associated with the electronic device.

Note that the computer system may include a controller for the network.

Moreover, establishing the connection may be initiated by the electronic device.

Furthermore, the packet may be a tunnel packet.

Additionally, the firewall and/or the second firewall may include a NAT firewall. Note that the IP address may include a public IP address of the electronic device and the second IP address may include a second public IP address of the second electronic device.

In some embodiments, the computer system may provide, to the port, an instruction addressed to the IP address to establish a tunnel with the second electronic device. Alternatively or additionally, the computer system may provide, to the second port, an instruction addressed to the second IP address to establish a tunnel with the electronic device.

In some embodiments, after receiving the acknowledgment, the computer system may store the IP address of the electronic device and the port in the firewall associated with the electronic device.

Another embodiment provides the electronic device. Note that the electronic device may be pre-provisioned with the address of the computer system. Moreover, after the connection is established, the electronic device may continue to provide packets addressed to the computer system to maintain the connection.

Another embodiment provides the second electronic device.

Another embodiment provides a computer-readable storage medium with program instructions for use with the computer system, the electronic device or the second electronic device. When executed by the computer system, the electronic device or the second electronic device, the program instructions cause the computer system, the electronic device or the second electronic device to perform at least some of the aforementioned operations or counterparts to the aforementioned operations in one or more of the preceding embodiments.

Another embodiment provides a method, which may be performed by the computer system, the electronic device or the second electronic device. This method includes at least some of the aforementioned operations or counterparts to the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
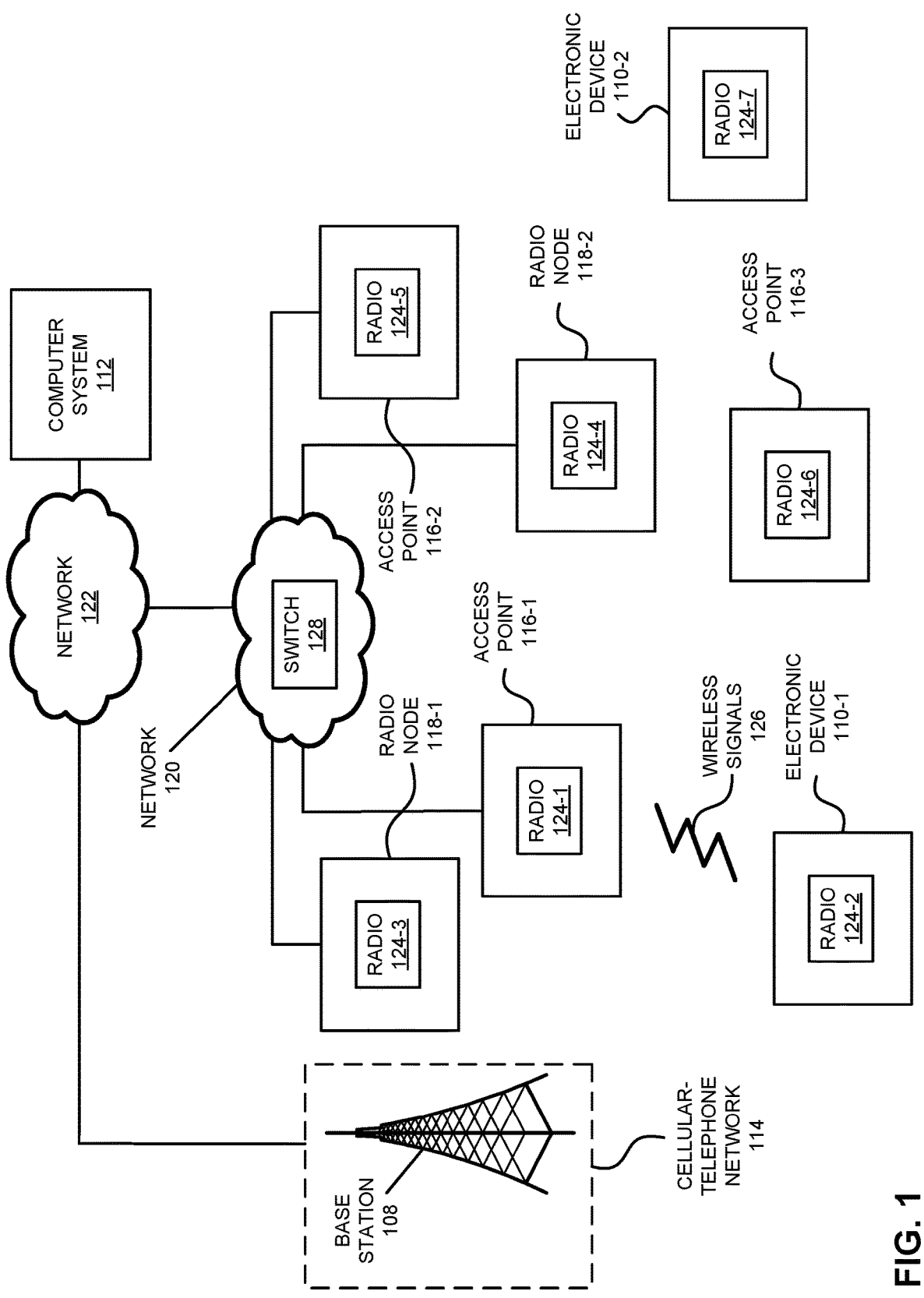
FIG. 1 is a block diagram illustrating an example of communication among electronic devices in accordance with an embodiment of the present disclosure.

A computer system (such as a controller) that facilitates discovery of electronic devices in a network is described. During operation, the computer system may establish a connection with an electronic device in the network, where the electronic device is associated with a firewall. Then, the computer system may receive a packet associated with the electronic device, where the packet includes an IP address of the electronic device and is associated with a port in the firewall. Moreover, the computer system may provide, to the port, a response addressed to the IP address. Next, the computer system may receive an acknowledgment associated with the electronic device that indicates that the response was received. Furthermore, the computer system may provide, addressed to the electronic device, a second IP address of a second electronic device and a second port in a second firewall associated with the second electronic device. Additionally, the computer system may provide, addressed to the second electronic device, the IP address of the electronic device and the port in the firewall associated with the electronic device.

By facilitating the discovery of the electronic device and the second electronic device, these communication techniques may facilitate secure communication in an SD-WAN. Notably, the electronic device and the second electronic device may use the information determined and provided by the computer system to establish secure communication between the electronic device and the second electronic device. For example, the electronic device and the second electronic device may establish a tunnel between the electronic device and the second electronic device. Moreover, the secure communication may be established even though the electronic device and the second electronic device are, respectively, located behind the firewall and the second firewall, which otherwise obscure the IP addresses and ports associated with the electronic device and the second electronic device. Furthermore, the solution provided by the embodiments of the communication techniques may not require firewall configuration changes (such as a change in the configuration of a NAT firewall). By facilitating the secure communication in the SD-WAN, the communication techniques may increase the satisfaction of users of the computer system and the network, such as network operators or administrators and/or customers.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi ®,' from the Wi-Fi Alliance of Austin, Texas), Bluetooth, a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi, LTE and Ethernet are used as illustrative examples.

We now describe some embodiments of the communication techniques. FIG. 1 presents a block diagram illustrating an example of communication between one or more electronic devices 110 (such as cellular telephones, portable electronic devices, stations or clients, another type of electronic device, etc., which are sometimes referred to as 'consumers') via a cellular-telephone network 114 (which may include a base station 108), one or more access points 116 (which may communicate using Wi-Fi) in a WLAN and/or one or more radio nodes 118 (which may communicate using LTE) in network (such as a small-scale network, e.g., a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, computer system 112 (which may be a controller, such as a local or a cloud-based controller that manages and/or configures access points 116, radio nodes 118 and/or switch 128, or that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

As described further below with reference to FIG. 12, electronic devices 110, computer system 112, access points 116, radio nodes 118, and/or switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) and/or multiple-input multiple-output (MIMO).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to discover electronic devices in an SD-WAN when the electronic devices are located behind firewalls (and, thus, have private IP addresses). Moreover, as described further below with reference to FIGS. 2-5, in order to addresses these difficulties, computer system 112 (which may include one or more computers) may implemented one or more embodiments of the communication techniques. Notably, electronic device 110-1 may be pre-provisioned with an address of computer system 112. Using the pre-provisioned address, electronic device 110-1 may establishes a connection with computer system 112. Note that electronic device 110-1 may be associated with a firewall. For example, electronic device 110-1 may be located behind a NAT firewall and/or another type of firewall.

After the connection is established, electronic device 110-1 may provide one or more packets to computer system 112. A given packet may include an initial IP address of electronic device 110-1 and a (source) port in the firewall. The firewall may translate the initial IP address and the port into a translated IP address (such as a public IP address) and a translated port.

Moreover, after receiving the one or more packets, computer system 112 may provide, to the translated port, a response addressed to the translated IP address of electronic device 110-1. While forwarding the response to electronic device 110-1, the firewall may translate the translated IP address and the translated (destination) port into the initial IP address and the port.

After receiving the response, electronic device 110-1 may provide an acknowledgment to computer system 112 that indicates that the response was received by electronic device 110-1. In some embodiments, after receiving the acknowledgment, computer system 112 may store (e.g., in memory) the translated IP address of electronic device 110-1 and the translated port in the firewall associated with electronic device 110-1.

Next, computer system 112 may provide, addressed to electronic device 110-1, a second translated IP address (such as a second public IP address) of electronic device 110-2 and a second translated port in a second firewall associated with electronic device 110-2 (e.g., electronic device 110-2 may be located behind the second firewall, such as a NAT firewall and/or another type of firewall). Note that electronic device 110-2 may be at a geographically remote location from electronic device 110-1 (such as a different branch in an SD-WAN). Additionally, computer system 112 may provide, addressed to electronic device 110-2, the translated IP address of electronic device 110-1 and the translated port in the firewall associated with electronic device 110-1.

Using the exchanged discovery information, electronic devices 110-1 and 110-2 may establish a tunnel (and, more generally, secure communication). Then, electronic devices 110-1 and 110-2 may communicate with each other via the tunnel in the SD-WAN. In some embodiments, the tunnel may be established based at least in part on instructions from computer system 112. For example, computer system 112 may provide, to the translated port, an instruction addressed to the translated IP address to establish a tunnel with electronic device 110-2. Alternatively or additionally, computer system 112 may provide, to the second translated port, an instruction addressed to the second translated IP address to establish a tunnel with electronic device 110-1.

In these ways, the communication techniques may facilitate secure communication in an SD-WAN. Moreover, the secure communication may be established even though electronic device 110-1 and electronic device 110-2 are, respectively, located behind the firewall and the second firewall, which otherwise obscure the untranslated (or private) IP addresses and ports associated with electronic devices 110-1 and 110-2. Furthermore, establishing the secure communication may not require firewall configuration changes (such as a change in the configuration of a NAT firewall). Consequently, the communication techniques may increase the satisfaction of users of computer system 112 and the network that includes electronic devices 110-1 and 110-2, such as network operators or administrators and/or customers.

While the preceding discussion illustrated the use of the communication techniques to exchange discovery information about electronic devices 110, in other embodiments the communication techniques are used to exchange discovery information about infrastructure in a network, such as access points 116 and/or radio nodes 118.

Figure 2:
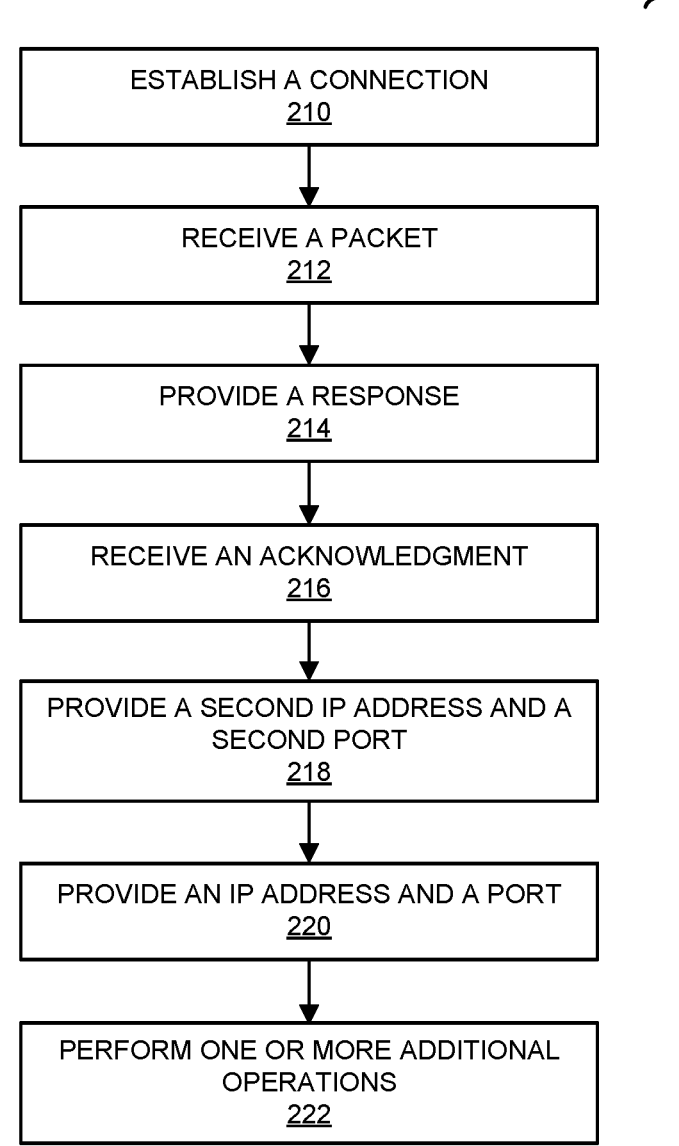
FIG. 2 is a flow diagram illustrating an example of a method for facilitating discovery of electronic devices in a network using a computer system in FIG. 1 in accordance with an embodiment of the present disclosure.

We now describe embodiments of the method. FIG. 2 presents a flow diagram illustrating an example of a method 200 for discovering electronic devices, which may be performed by a computer system (such as computer system 112 in FIG. 1). During operation, the computer system may establish a connection (operation 210) with an electronic device in the network, where the electronic device is associated with a firewall.

Note that the computer system may include a controller for the network. Moreover, establishing the connection may be initiated by the electronic device. Furthermore, the packet may include a tunnel packet.

Then, the computer system may receive a packet (operation 212) associated with the electronic device, where the packet includes an IP address of the electronic device and is associated with a port in the firewall. Moreover, the computer system may provide, to the port, a response (operation 214) addressed to the IP address. Next, the computer system may receive an acknowledgment (operation 216) associated with the electronic device that indicates that the response was received. Furthermore, the computer system may provide, addressed to the electronic device, a second IP address of a second electronic device and a second port in a second firewall (operation 218) associated with the second electronic device. Additionally, the computer system may provide, addressed to the second electronic device, the IP address of the electronic device and the port in the firewall (operation 220) associated with the electronic device.

In some embodiments, the computer system optionally performs one or more additional operations (operation 222). For example, after receiving the acknowledgement (operation 216), the computer system may store the IP address of the electronic device and the port in the firewall associated with the electronic device In some embodiments, the computer system may provide, to the port, an instruction addressed to the IP address to establish a tunnel with the second electronic device. Alternatively or additionally, the computer system may provide, to the second port, an instruction addressed to the second IP address to establish a tunnel with the electronic device.

Moreover, the firewall and/or the second firewall may include a NAT firewall. Note that the IP address may include a public IP address of the electronic device and the second IP address may include a second public IP address of the second electronic device.

In some embodiments of method 200, there may be additional or fewer operations. Furthermore, the order of the operations may be changed, and/or two or more operations may be combined into a single operation.

Figure 3:
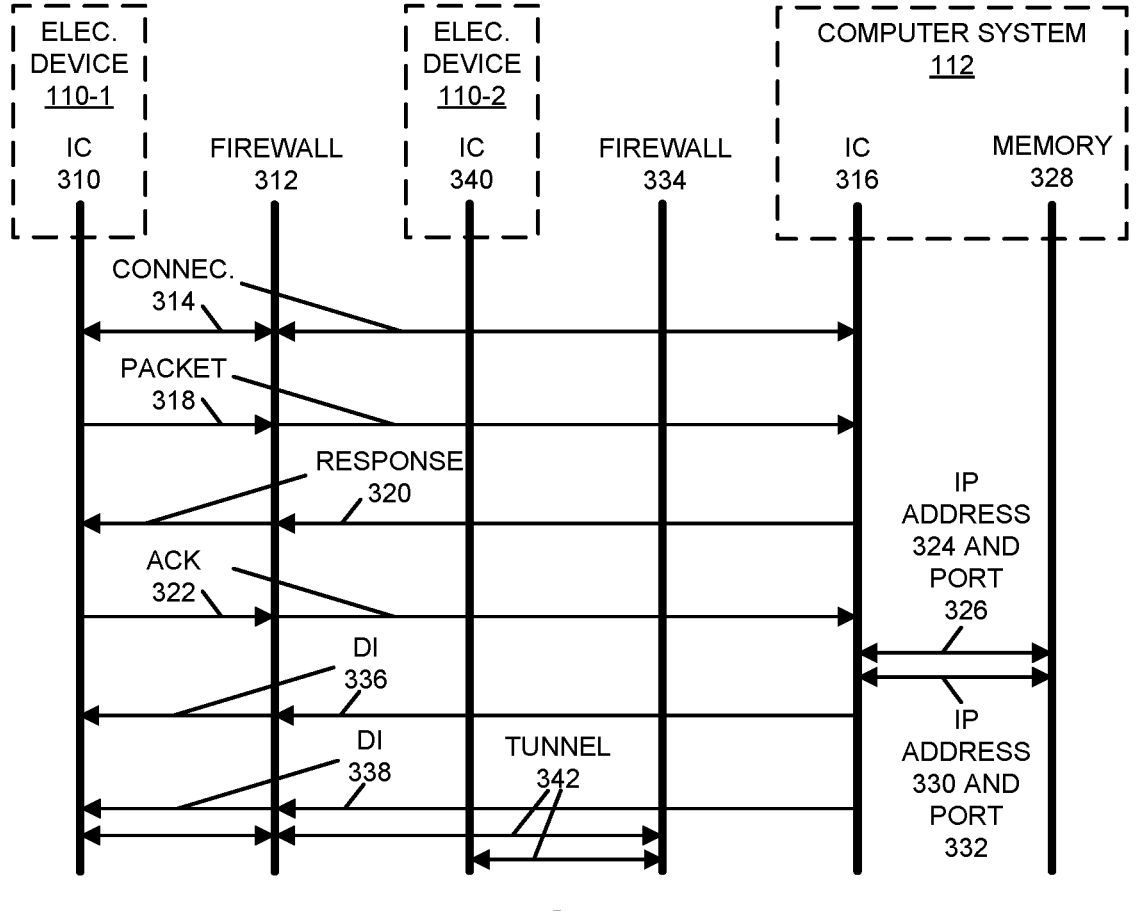
FIG. 3 is a drawing illustrating an example of communication among electronic devices and a computer system in FIG. 1 in accordance with an embodiment of the present disclosure.

Embodiments of the communication techniques are further illustrated in FIG. 3, which presents a drawing illustrating an example of communication among electronic devices 110 and computer system 112. An interface circuit (IC) 310 in electronic device 110-1 may establish a connection 314 with an interface circuit 316 in computer system 112, where electronic device 110-1 is located behind a firewall 312. Then, interface circuit 310 may provide a packet 318 to computer system 112, where packet 318 includes an initial IP address of electronic device 110-1 and is associated with an initial port in firewall 312. When packet 318 passes through firewall 312, firewall 312 may translate the initial IP address in packet 318 into IP address 324 (such as a public IP address of electronic device 110-1) and may translate the initial port to port 326. (Therefore, IP address 324 and port 326 are sometimes referred to as a 'translated IP address' and a 'translated port,' respectively.)

After receiving packet 318, interface circuit 316 may provide, to port 326, a response 320 addressed to IP address 324. This response may be forwarded to electronic device 110-1 by firewall 312 via port 326. When firewall 312 forwards response 320 to electronic device 110-1, firewall 312 may translate IP address 324 back to the initial IP address (such as a private IP address of electronic device 110-1) and may translate port 326 to the initial port.

Next, interface circuit 310 may provide an acknowledgment 322 to computer system 112 that indicates that response 320 was received by electronic device 110-1. After receiving acknowledgment 322, interface circuit 316 may optionally store IP address 324 of electronic device 110-1 and port 326 in firewall 312 associated with electronic device 110-1 in memory 328 in computer system 112.

Furthermore, interface circuit 316 may access, in memory 328, an IP address 330 of electronic device 110-2 and a port 332 in a firewall 334 associated with electronic device 110-2. Note that electronic device 110-2 is located behind firewall 334. Consequently, IP address 330 and port 332 may be the translated IP address and the translated port of electronic device 110-2.

Then, interface circuit 316 may provide, addressed to electronic device 110-1 (e.g., to port 326 and with IP address 324), discovery information (DI) 336 (including IP address 330 of electronic device 110-2 and port 332 in firewall 334 associated with electronic device 110-2), which may be received by interface circuit 310 Additionally, interface circuit 310 may provide, addressed to electronic device 110-2 (e.g., to port 332 and with IP address 330), discovery information 338 (including IP address 324 of electronic device 110-1 and port 326 in firewall 312 associated with electronic device 110-1), which may be received by interface circuit 340 in electronic device 110-2.

Using the exchanged discovery information 336 and 338 (e.g., IP address 324, port 326, IP address 330 and port 332), interface circuit 310 and interface circuit 340 may establish a tunnel 342 between electronic device 110-1 and electronic device 110-2.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe the communication techniques. SD-WAN systems are often created with various topologies, such as hub-n-spoke, mesh or hybrid of mesh and hubs. Many electronic devices in SD-WANs have public IP addresses. This may allow the edge devices to discover or reach each other, and thus may facilitate the creation of secure connections (such as tunnels), e.g., in a full-mesh systems. For example, when electronic devices A and B have public IP addresses, such as 24.6.22.216 and 24.6.22.217 respectively, these electronic devices may set up a bidirectional tunnel between them. However, if electronic devices A and B both have private IP addresses (such as 10.6.22.216 and 10.6.22.217, respectively), then these electronic devices will not be able to directly discover or reach other, and thus will not be able to establish secure communication (such as a tunnel between electronic devices A and B).

Figure 4:
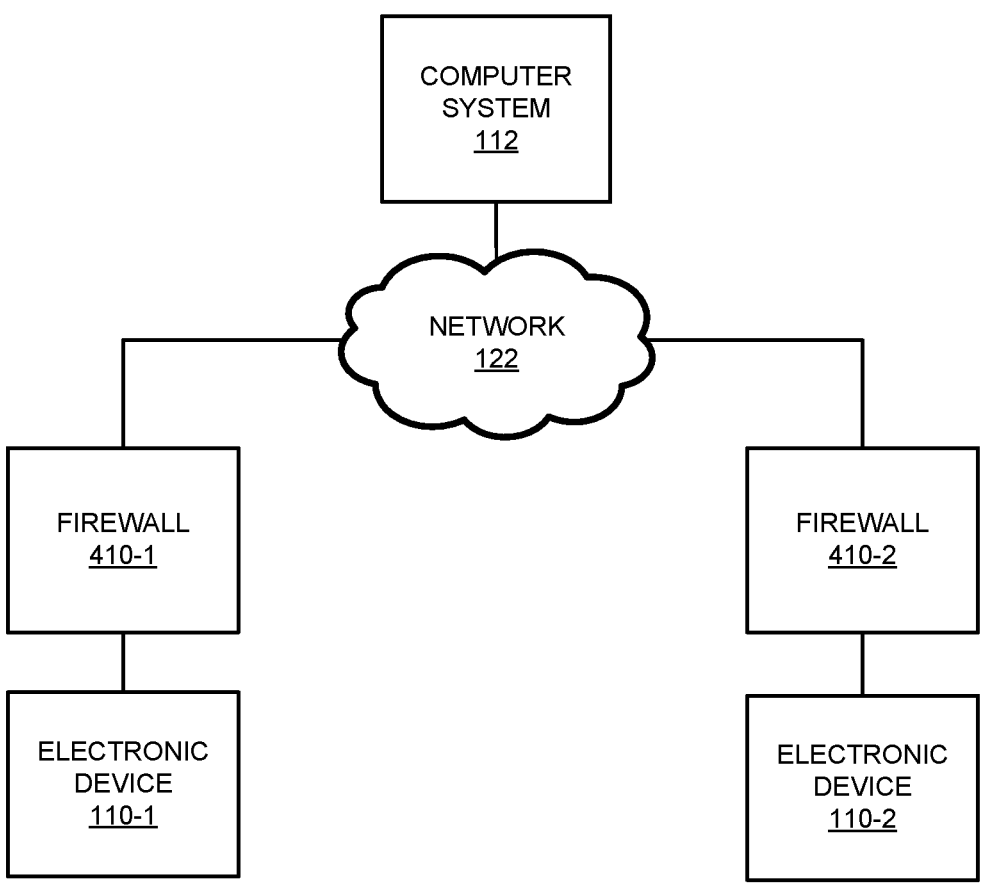
FIG. 4 is a drawing illustrating an example of communication among electronic devices and a computer system in FIG. 1 in accordance with an embodiment of the present disclosure.

An embodiment of a solution to this problem is shown in FIG. 4, which presents a drawing illustrating an example of communication among electronic devices 110 (or edge devices) and a computer system 112 (such as a cloud-based controller). Note that electronic devices 110 may form an SD-WAN among themselves. Moreover, note that electronic devices 110 are each behind a NAT firewall 410 and/or another type of firewall.

Initially, electronic device 110-1 may communicate with computer system 112 and may establish a control connection between electronic device 110 and computer system 112. For example, this communication may use IP or User Datagram Protocol (UDP) packets. The control connection may be based at least in part on a bidirectional communication protocol, such as WebSocket (from the Internet Engineering Task Force of Wilmington, Delaware). Because the connection is initiated by electronic device 110-1, NAT firewall 410-1 and/or the other type of firewall may not cause a problem.

Then, electronic device 110-1 may choose or select a source port and may send traffic (such as a packet) using the same communication protocol that will be subsequently used to establish a tunnel with electronic device 110-2, with the difference that the destination is computer system 112. For example, electronic device 110-1 may provide test packets to computer system 112 using different ports via NAT firewall 410-1 and/or the other type of firewall in order to determine which port(s) are available (based at least in part on subsequent response(s) from computer system 112). Note that NAT firewall 410-1 and/or the other type of firewall may perform an IP address translation (e.g., to a public IP address) and a port translation.

After receiving the packet, computer system 112 may detect the public IP address and translated port, and may reply using the received translated port and the translated IP address as the destination port and IP address. Note that the packet provided by electronic device 110-1 and the response from computer system 112 may be communicated using secure communication (such as using a Hypertext Transfer Protocol Secure or HTTPS).

Assuming that NAT firewall 410-1 and/or the other type of firewall does not drop the response because of a security policy, electronic device 110-1 may receive the response (and, more generally, one or more packets in the response) and may inform computer system 112 that it is receiving traffic from computer system 112. In some embodiments, electronic device 110-1 may continue to send a packet stream to computer system 112 to ensure that NAT firewall 410-1 and/or the other type of firewall does not time out and, therefore, maintains the same translation of the IP address and the port of electronic device 110-1. For example, NAT firewall 410-1 may only care about the port used by a given packet not the destination, and NAT firewall 410-1 may keep the port open for 10 s of seconds when electronic device 110-1 sends out traffic. Therefore, if electronic device 110-1 uses the port regularly (such as every 10 s), NAT firewall 410-1 may maintain the same translation of the IP address and the port of electronic device 110-1.

Moreover, computer system 112 may optionally store edge-device identifier information associated with electronic device 110-1, such as the translated IP address and the translated port of electronic device 110-1.

Next, computer system 112 may provide to electronic device 110-1 the edge-device identifier information associated with electronic device 110-2, such as the translated IP address and the translated port of electronic device 110-2. Furthermore, computer system 112 may provide to electronic device 110-2 the edge-device identifier information associated with electronic device 110-1, such as the translated IP address and the translated port of electronic device 110-1. For example, computer system 112 may provide this discovery information to electronic device 110-1 or 110-2 using one or more IP or UDP packets.

Using the exchanged discovery information (such as the translated IP addresses and the translated ports), electronic devices 110-1 and 110-2 may establish a secure tunnel between them and then may communicate with each other in the SD-WAN. For example, electronic devices 110-1 and 110-2 may randomly send packets to each other, so that they can set up the tunnel via open ports in firewalls 410.

In some embodiments where there are multiple other known electronic devices in a network, computer system 112 may repeat the exchange of the discovery information to provide additional edge-device identifier information associated with these other known electronic devices. Alternatively, the additional edge-device identifier information may be included in the discovery-information communicated to electronic device 110-1, and computer system 112 may repeat the exchange of the discovery information about electronic device 110-1 with the other known electronic devices. In this way, computer system 112 may facilitate the establishment of tunnels between multiple electronic devices in an SD-WAN.

Figure 5:
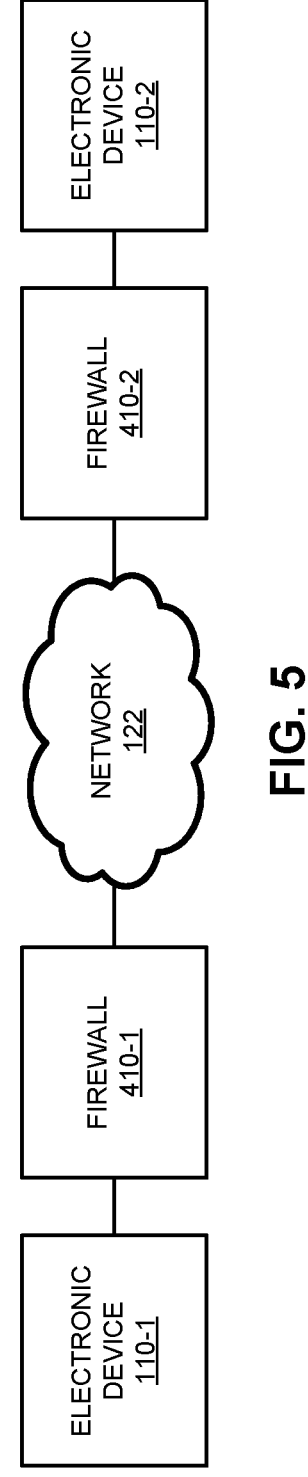
FIG. 5 is a drawing illustrating an example of communication between electronic devices in accordance with an embodiment of the present disclosure.

The basis of the communication techniques is further illustrated in FIG. 5, which presents a drawing illustrating an example of communication between electronic devices 110. Notably, electronic devices 110 may use a controller 510 to provide translated IP addresses and port numbers to each other. For example, a packet from electronic device 110-1 may have an initial source IP address of 10.10.10.100: 10000, and after firewall 410-1 this packet may include a translated source IP address 34.6.14.100:11000. Moreover, a packet to electronic device 110-1 may have a destination address of 22.6.14.110:12000, which may be unchanged after firewall 410-1. Similarly, a packet from electronic device 110-2 may have an initial source IP address of 10.10.20.100:10000, and after firewall 410-2 this packet may include a translated source IP address 22.6.14.110: 12000. Moreover, a packet to electronic device 110-2 may have a destination address of 34.6.14.100:11000, which may be unchanged after firewall 410-2. Because the source IP address and port for the incoming traffic matches the destination traffic, a given one of firewalls 410 may not block the traffic.

Figure 6:
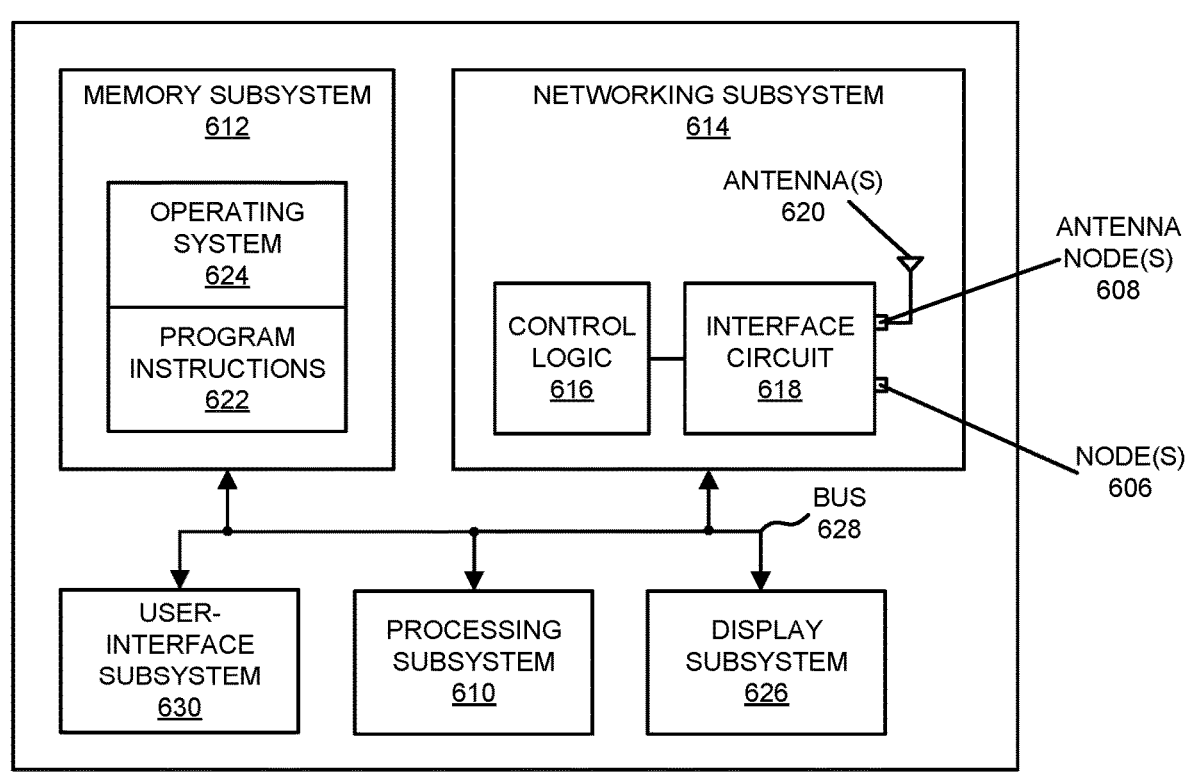
FIG. 6 is a block diagram illustrating an example of an electronic device in accordance with an embodiment of the present disclosure.

We now describe embodiments of an electronic device, which may perform at least some of the operations in the communication techniques. FIG. 6 presents a block diagram illustrating an example of an electronic device 600 in accordance with some embodiments, such as one of: base station 108, one of electronic devices 110, computer system 112, one of access points 116, one of radio nodes 118, or switch 128. This electronic device includes processing subsystem 610, memory subsystem 612, and networking subsystem 614. Processing subsystem 610 includes one or more devices configured to perform computational operations. For example, processing subsystem 610 can include one or more microprocessors, graphics processing units (GPUs), ASICs, microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include DRAM, static random access memory (SRAM), and/or other types of memory. In some embodiments, instructions for processing subsystem 610 in memory subsystem 612 include: one or more program modules or sets of instructions (such as program instructions 622 or operating system 624, such as Linux, UNIX, Windows Server, or another customized and proprietary operating system), which may be executed by processing subsystem 610. Note that the one or more computer programs, program modules or instructions may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as antenna nodes 608, e.g., a metal pad or a connector, which can be coupled to the one or more antennas 620, or nodes 606, which can be coupled to a wired or optical connection or link. Thus, electronic device 600 may or may not include the one or more antennas 620. Note that the one or more nodes 606 and/or antenna nodes 608 may constitute input(s) to and/or output(s) from electronic device 600.) For example, networking subsystem 614 can include a Bluetooth™ networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 600 may be adapted or changed using pattern shapers (such as directors or reflectors) and/or one or more antennas 620 (or antenna elements), which can be independently and selectively electrically coupled to ground to steer the transmit antenna pattern in different directions. Thus, if one or more antennas 620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Moreover, electronic device 600 may include a user-interface subsystem 630, such as: a mouse, a keyboard, a trackpad, a stylus, a voice-recognition interface, and/or another human-machine interface. In some embodiments, user-interface subsystem 630 may include or may interact with a touch-sensitive display in display subsystem 626.

Electronic device 600 can be (or can be included in) any electronic device with at least one network interface. For example, electronic device 600 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments instructions 622 is included in operating system 624 and/or control logic 616 is included in interface circuit 618.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614 and/or of electronic device 600. The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi, LTE and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 622, operating system 624 (such as a driver for interface circuit 618) or in firmware in interface circuit 618. Alternatively or additionally, at least some of the operations in the communication techniques may be implemented in a physical layer, such as hardware in interface circuit 618.

Note that the use of the phrases 'capable of,' capable to,' operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

The invention claimed is:

1. A computer system, comprising:

an interface circuit;

a processor coupled to the interface circuit; and memory, coupled to the processor, storing program instructions, wherein, when executed by the processor, the program instructions cause the computer system to perform operations comprising:

establishing a connection with an electronic device in a network, wherein the electronic device is behind a firewall that provides security for the electronic device;

receiving a packet associated with the electronic device, wherein the packet comprises an Internet Protocol (IP) address of the electronic device and is associated with a port in the firewall, and the IP address and the port are private;

providing, to the port, a response addressed to the IP address;

receiving an acknowledgment associated with the electronic device that indicates that the response was received;

providing, addressed to the electronic device, a second IP address of a second electronic device and a second port in a second firewall, wherein the second electronic device is behind the second firewall, wherein the second firewall provides security for the second electronic device, and wherein the second IP address and the second port are private;

providing, addressed to the second electronic device, the IP address of the electronic device and the port in the firewall associated with the electronic device;

providing, to the port, an instruction addressed to the IP address to establish a tunnel with the second electronic device; and providing, to the second port, a second instruction addressed to the second IP address to establish the tunnel with the electronic device, wherein the computer system is configured to facilitate discovery and secure communication between the electronic device and the second electronic device through the firewall and the second firewall, wherein communication between the computer system and the electronic device uses Hypertext Transfer Protocol Secure (HTTPS), and wherein the computer system is different from the firewall and the second firewall, the electronic device is different from the firewall, and the second electronic device is different from the second firewall.

2. The computer system of claim 1, wherein the computer system comprises a controller for the network.

3. The computer system of claim 1, wherein the establishing of the connection is initiated by the electronic device.

4. The computer system of claim 1, wherein the IP address comprises a public IP address of the electronic device and the second IP address comprises a second public IP address of the second electronic device.

5. The computer system of claim 1, wherein, after receiving the acknowledgment, the operations comprise storing the IP address of the electronic device and the port in the firewall associated with the electronic device.

6. A non-transitory computer-readable storage medium for use in conjunction with a computer system, the computer-readable storage medium storing program instructions that, when executed by the computer system, cause the computer system to perform operations comprising:

establishing a connection with an electronic device in a network, wherein the electronic device is behind a firewall that provides security for the electronic device;

receiving a packet associated with the electronic device, wherein the packet comprises an Internet Protocol (IP) address of the electronic device and is associated with a port in the firewall, and the IP address and the port are private;

providing, to the port, a response addressed to the IP address;

receiving an acknowledgment associated with the electronic device that indicates that the response was received;

providing, addressed to the electronic device, a second IP address of a second electronic device and a second port in a second firewall, wherein the second electronic device is behind the second firewall, wherein the second firewall provides security for the second electronic device, and wherein the second IP address and the second port are private;

providing, addressed to the second electronic device, the IP address of the electronic device and the port in the firewall associated with the electronic device;

providing, to the port, an instruction addressed to the IP address to establish a tunnel with the second electronic device; and providing, to the second port, a second instruction addressed to the second IP address to establish the tunnel with the electronic device, wherein the computer system facilitates discovery and secure communication between the electronic device and the second electronic device through the firewall and the second firewall, wherein communication between the computer system and the electronic device uses Hypertext Transfer Protocol Secure (HTTPS), and wherein the computer system is different from the firewall and the second firewall, the electronic device is different from the firewall, and the second electronic device is different from the second firewall.

7. The non-transitory computer-readable storage medium of claim 6, wherein the computer system comprises a controller for the network.

8. The non-transitory computer-readable storage medium of claim 6, wherein the establishing of the connection is initiated by the electronic device.

9. The non-transitory computer-readable storage medium of claim 6, wherein the IP address comprises a public IP address of the electronic device and the second IP address comprises a second public IP address of the second electronic device.

10. A method for facilitating discovery of electronic devices in a network, comprising:

by a computer system:

establishing a connection with an electronic device in the network, wherein the electronic device is behind a firewall that provides security for the electronic device;

receiving a packet associated with the electronic device, wherein the packet comprises an Internet Protocol (IP) address of the electronic device and is associated with a port in the firewall, and the IP address and the port are private;

providing, to the port, a response addressed to the IP address;

receiving an acknowledgment associated with the electronic device that indicates that the response was received;

providing, addressed to the electronic device, a second IP address of a second electronic device and a second port in a second firewall, wherein the second electronic device is behind the second firewall, wherein the second firewall provides security for the second electronic device, and wherein the second IP address and the second port are private;

providing, addressed to the second electronic device, the IP address of the electronic device and the port in the firewall associated with the electronic device;

providing, to the port, an instruction addressed to the IP address to establish a tunnel with the second electronic device; and providing, to the second port, a second instruction addressed to the second IP address to establish the tunnel with the electronic device, wherein the computer system facilitates the discovery and secure communication between the electronic device and the second electronic device through the firewall and the second firewall, wherein communication between the computer system and the electronic device uses Hypertext Transfer Protocol Secure (HTTPS), and wherein the computer system is different from the firewall and the second firewall, the electronic device is different from the firewall, and the second electronic device is different from the second firewall.

11. The method of claim 10, wherein the computer system comprises a controller for the network.

12. The method of claim 10, wherein the establishing of the connection is initiated by the electronic device.

13. The method of claim 10, wherein the IP address comprises a public IP address of the electronic device and the second IP address comprises a second public IP address of the second electronic device.

14. The method of claim 10, wherein, after receiving the acknowledgment, the method comprises storing the IP address of the electronic device and the port in the firewall associated with the electronic device.

\* \* \* \* \*